Patented Oct. 4, 1949

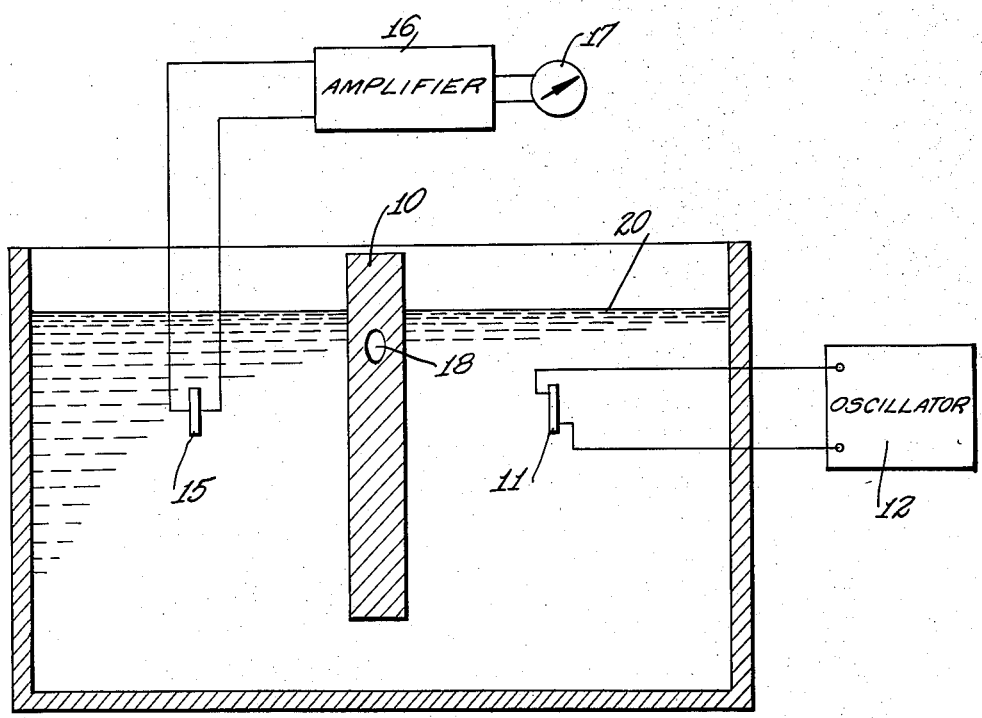

2,483,821

UNITED STATES PATENT OFFICE 2,483,821

INSPECTION OF A SOLID PART UTILIZING SUPERSONIC TRANSMISSION

Floyd A. Firestone, Ann Arbor, Mich., assignor to Sperry Products, Inc., Hoboken, N. J., a corporation of New York Application June 28, 1945, Serial No. 602,103

3 Claims. (Cl. 73—67)

This invention relates to the inspection of materials by supersonic waves. Such inspection may be effected either by causing the supersonic wave to be transmitted through the material and detecting the presence of flaws by the influence which they exert on the transmitted wave, or by causing the incident beam to be reflected from the surface presented by the flaw and measuring the elapsed time between sending and receiving the wave, as disclosed in my Patent No. 2,280,226, granted April 21, 1942. In one method of supersonic inspection, a plate to be inspected is moved past a wave sending station and the wave transmitted through the plate is received at a receiving station. In order that the plate may be moved relative to said stations, so that the entire area may be inspected, the sending and receiving means, which are one or more electro-acoustic transducers, are spaced from the plate. Since the waves cannot be transmitted effectively through air, the plate to be inspected, as well as the wave sending and receiving mechanisms are immersed in a liquid.

In the above arrangement it has been found that standing waves are set up between the sending means and the plate and between the receiving means and the plate. These standing waves are the result of multiple reflections between the plate and the sending and receiving means. If the distances between the plate and the sender and receiver could be kept absolutely constant, these standing waves would not create any special problem. However, it is not possible to prevent slight variations in these distances. Since the supersonic wave, and hence the standing wave may have a frequency of one million to ten million cycles or more, it will be realized that a wave length is extremely small and a change of distance between the transducer and the plate of one half wave length (which may be a fraction of a millimetre) will cause the transducer to change from the position of a node to the position of an anti-node. In other words, such a minute change will cause a variation corresponding to the full amplitude of the standing wave, which may correspond to several volts output. This variation is large in comparison with the variation introduced in the transmitted wave by a flaw in the plate under inspection, so that a flaw may possiby be missed because it is obscured by the larger variation due to the change of position of the transducer relative to the standing wave.

It is therefore the principal object of this invention to minimize the effect of the standing wave.

Further objects and advantages of this invention will become apparent in the following detailed description thereof.

The accompanying drawing is a vertical section, largely diagrammatic, showing one embodiment of this invention.

Referring to the drawing, there is shown a plate 10 which is to be inspected by supersonic means. In the form shown, an electro-acoustic transducer 11 in the form of a quartz crystal is connected to an oscillator 12 for generating and transmitting a supersonic wave through the plate 10, and the effect of the plate on the wave transmitted therethrough is detected by a receiving electro-acoustic transducer 15 which is also a quartz crystal. An electro-acoustic transducer is a device for converting an alternating voltage into a sound wave and vice versa. The sound waves received by the crystal 15 are converted into electric voltages which may be amplified by any suitable amplifier 16 whose output may be indicated by any suitable indicator 17.

To permit the plate 10 to be moved relative to the sending and receiving crystals without actual contact which would be impractical because of wear on the crystals, the plate and the crystals are immersed in a liquid. The liquids which have heretofore been used such as water and mercury have caused standing waves to be set up between the transducers and the plate under inspection, as set forth in the introduction hereto. Any slight variations in the distance between plate 10 and crystal 11 such as are unavoidable in actual testing will cause changes in the amount of standing wave which is transmitted through the plate 10. There is also a second standing wave system between the crystal 15 and the plate 10, and unavoidable variations in this distance cause changes in the amount of standing wave intercepted by the crystal 15 as indicated on the indicator 17. These standing wave effects are often of such magnitude as to cause changes of reading of the indicator of a factor of 10 or more due to slight variations in the relative positions of the plate and transducers, thereby completely masking in many cases the effect of small flaws, such as shown at 18, whose influence on coming between the crystals 11 and 15 is less than the effect of unavoidable variations in the positions of the crystals relative to the standing wave.

My solution of the above problem consists in employing as the medium through which the waves are transmitted, a liquid having the property of considerably attenuating the supersonic waves, i. e., of absorbing the energy of these waves. Since the standing waves are produced by successive reflections between the crystal and the plate, such absorption of energy will serve to cut down the number of reflections and to reduce the amplitude of its vibrations. The medium must be such that absorption will serve to minimize the effect of the standing waves to a point where the minimum flaws to be detected are not obscured by the standing waves. One such medium is castor oil. Such absorption of energy will serve to cut down the overall transmission from crystal 11 to crystal 15, but to a considerably lesser extent than the standing waves because of the absence of successive reflections. This loss in overall transmission can be overcome by using additional amplification in amplifier 16.

Attenuation is here used to indicate the phenomenon wherein the energy of a wave is converted into heat as the wave travels through the medium. In the case of a plane wave, attenuation gives rise to an exponential decay of energy with distance traveled. The energy of a wave is proportional to the square of its amplitude, other things being constant.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a supersonic inspection system for a solid body, wherein supersonic waves are adapted to be passed through the body from a transmitter spaced from the body and the waves are measured by a receiver spaced from the body, the method of minimizing the standing waves between the body and the transmitter and between the body and the receiver, which consists in immersing the body, the receiver and the transmitter in a liquid having wave attenuating properties sufficient to reduce the standing waves to a point where they are insufficient to interfere with the effect of the smallest defects to be detected in the body, and amplifying the waves received by the receiver to such degree as to make them measurable.

2. In a supersonic inspection device for a solid body, a liquid in which the body is immersed, means immersed in the liquid for generating supersonic waves and passing the waves through the liquid to strike the body, means immersed in the liquid for receiving supersonic waves transmitted through said body, said liquid having capacity to attenuate the waves to a degree such that standing waves between the generating means and the body and between the receiving means and the body are reduced to a point where the standing waves are insufficient to interfere with the effect of the smallest defects to be detected in the body, and an amplifier for amplifying the waves received by the receiver to such degree as to make them measurable.

3. An inspection device as specified in claim 2, in which the liquid is castor oil.

FLOYD A. FIRESTONE.

REFERENCES CITED

The following references are of record in the file of this patent:

UNITED STATES PATENTS

| Number | Name | Date |
|---|---|---|
| 2,378,237 | Morris | June 12, 1945 |

FOREIGN PATENTS

| Number | Country | Date |
|---|---|---|
| 25,207 | Great Britain | 1913 |

OTHER REFERENCES

An article entitled "Supersonics at Work," by Keith Henney, published in the Scientific American, July 1944, pgs. 10–12.

A book entitled "Supersonics, the Science of Inaudible Sounds," by R. W. Wood, published by Brown University, Providence, R. I., 1939, pages 50–55 and 121–123.